United States Patent
Zhou et al.

(10) Patent No.: US 7,554,931 B2
(45) Date of Patent: Jun. 30, 2009

(54) SYSTEM AND METHOD FOR REMOTE DYNAMIC NETWORK CONFIGURATION

(75) Inventors: Jia-Bao Zhou, Shanghai (CN); Yu-Tien Wu, Taipei (TW)

(73) Assignee: Mitac International Corp., Hsinchu County (TW)

( * ) Notice: Subject to any disclaimer, the term of this patent is extended or adjusted under 35 U.S.C. 154(b) by 484 days.

(21) Appl. No.: 11/435,739

(22) Filed: May 18, 2006

(65) Prior Publication Data

US 2007/0121527 A1    May 31, 2007

(30) Foreign Application Priority Data

Nov. 30, 2005    (TW) ................. 94142135 A

(51) Int. Cl.
*H04L 12/28*    (2006.01)
*H04L 12/56*    (2006.01)
*G06F 15/177*    (2006.01)
*G06F 15/173*    (2006.01)

(52) U.S. Cl. ............... 370/254; 370/389; 370/392; 709/220; 709/223

(58) Field of Classification Search ............ None
See application file for complete search history.

(56) References Cited

U.S. PATENT DOCUMENTS

| 7,472,179 | B2 * | 12/2008 | Tarui et al. ............... 709/223 |
| 2003/0140137 | A1 * | 7/2003 | Joiner et al. .............. 709/224 |
| 2003/0145075 | A1 * | 7/2003 | Weaver et al. ............. 709/223 |
| 2005/0030955 | A1 * | 2/2005 | Galin et al. .............. 370/401 |
| 2006/0031488 | A1 * | 2/2006 | Swales ................... 709/224 |

* cited by examiner

*Primary Examiner*—Wing F Chan
*Assistant Examiner*—Hicham B Foud
(74) *Attorney, Agent, or Firm*—Bacon & Thomas, PLLC

(57) ABSTRACT

A computer-executable system and method thereof are provided for remote dynamic network configuration in a remote network management environment of TCP/IP base. Through a server management daughter card located on an agent terminal, a medium access control address of the agent terminal is used to request a corresponsive internet protocol (IP) from a remote managing server. Thus to accomplish the network configuration of the agent terminal, and to allow a remote terminal to use the IP to manage the agent terminal via the managing server, or to utilize the managing server directly to execute a TCP/IP-based, remote network control procedure.

20 Claims, 6 Drawing Sheets

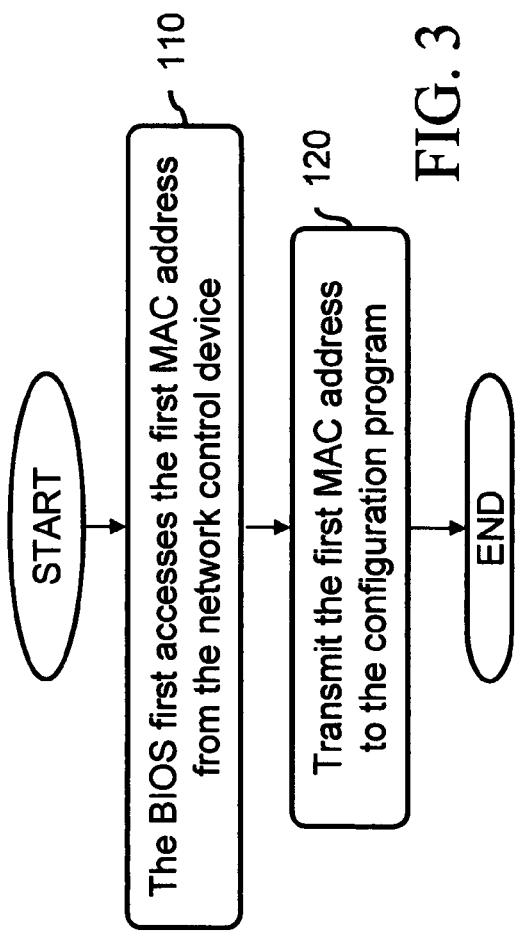
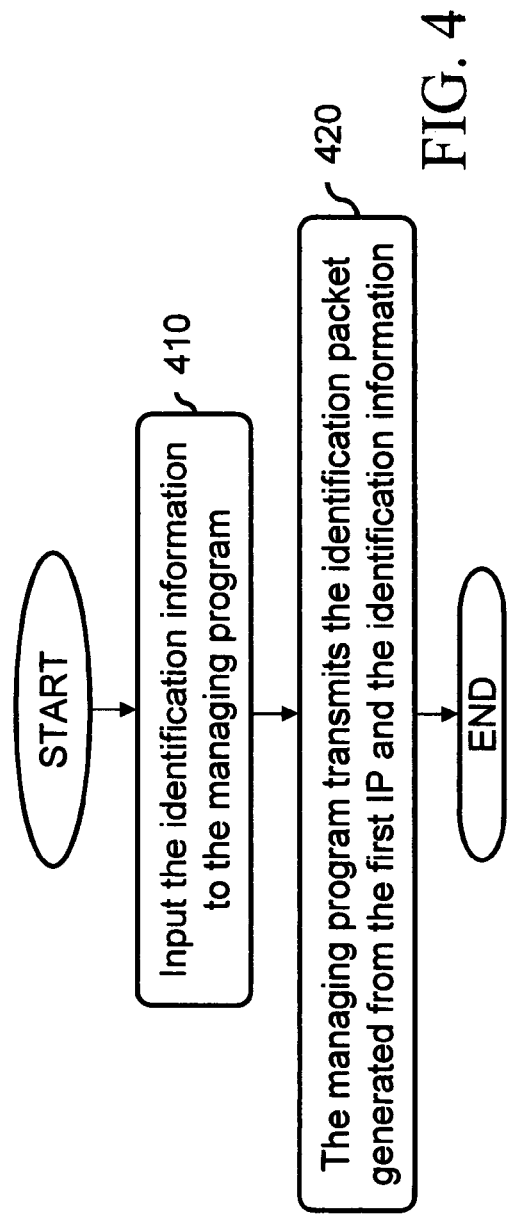

SYSTEM AND METHOD FOR REMOTE DYNAMIC NETWORK CONFIGURATION

BACKGROUND OF THE INVENTION

1. Field of Invention

The present invention relates to a system and a method for remote dynamic network configuration, and more particularly to a system and a method that utilize a MAC address of an agent terminal to request a corresponding IP from a managing server and to finalize the remote network configuration of the agent terminal.

2. Prior Art

Generally, a remote network management environment of TCP/IP (Transmission Control Protocol/Internet Protocol) base, as shown in FIG. 1 substantially, includes basic elements such as plural remote terminals 10, internet 20, plural managing server 30 and plural agent terminals 40. Each of the managing server 30 is capable of connecting with the agent terminals 40 thorough the intranet architecture, while every remote terminal 10 connects to every managing server 30 through the internet 20. To manage from remote internet, the remote terminal 10 can be used to choose certain managing server 30 via the internet 20 to execute necessary control procedures on the certain agent terminal 40 linked with the certain managing server 30. Also, the managing server 30 itself can be used to control directly linked agent terminals 40.

To accomplish remote network management based on TCP/IP, SMDC (Server Management Daughter Card) 43 is used on the agent terminals 40 to communicate with the managing server, 30 and execute commands from the remote terminals 10 or the managing server 30. However, the management architecture has a premise that the remote terminals 10 and the managing server 30 need to communicate with the agent terminal 40 through IP (Internet Protocol); more precisely, to communicate with the SMDC 43 on each of the agent terminals 40. Therefore, how to configure related network configuration for the SMDC 43 on the agent terminal 40 becomes a significant issue.

In the prior art, all the agent terminals 40 must be actuated first to allow a user to configure network configuration for the SMDC 43 one by one. Besides, operating system has to be installed in all of the agent terminal 40 first and then a certain application program is available for network configuration of the SMDC 43. Accordingly, the user can not communicate with the SMDC 43 from the managing server 30 without long configuration procedures on all of the agent terminals 40. Wrong network configuration could be generated due to artificial processes.

SUMMARY OF THE INVENTION

In accordance with above technical problems in current remote network management environment of TCP/IP base, the present invention provides a computer-executable system and method to achieve remotely dynamic network configuration.

The present invention is mainly applied to agent terminal and managing server. Through a configuration program implemented in a SMDC of the agent terminal, a MAC address of the agent terminal can be transmitted to a managing program of the managing server. Then a corresponsive IP is assigned to the SMDC of the agent terminal. Meanwhile, the agent terminal items in the managing program are updated. When the dynamic network configuration between the managing server and the agent terminal is finished, the managing server or a remote terminal linked to the managing server can be utilized to execute the remote network control based on TCP/IP.

The present invention discloses a computer-executable system for remote dynamic network configuration. The system includes:

(1) Agent terminal: The agent terminal has a first MAC address and further includes:

a. SMDC: The SMDC executes the configuration program that transmits a first respond packet and/or a second respond packet to the managing program of the managing server.

b. Basic input/output system (BIOS): The BIOS assigns the first MAC address of the agent terminal to the configuration program.

(2) Managing server: Through an intranet, the managing server is capable of communicating with the agent terminal and executing a managing program that accesses/records an agent, terminal discovery table and an IP index for transmitting a detection packet and an identification packet to the configuration program of the agent terminal. The agent terminal discovery table has the first MAC address corresponsive to the agent terminal, while the IP index has a first IP corresponsive to the first MAC address.

The method for remote dynamic network configuration according to the present invention further includes the following steps. The configuration program first receives the detection packet from the managing program and then responds the first respond packet with the first MAC address by the configuration program. The managing program updates the first MAC address into the agent terminal discovery table afterwards. Next, the managing program responds the identification packet with the first IP to the configuration program if the first IP corresponsive to the first MAC address is found in the IP index. Moreover, the configuration program saves the first IP of the identification packet and responds the second respond packet with the first MAC address and the first IP to the managing program. So the managing program updates the first IP to the agent terminal discovery table corresponsive to the first MAC address. Accordingly, the dynamic network configuration of the agent terminal is finished.

By way of the system and method disclosed by the present invention, the technical problems in the prior art is solved and certain effects are also achieved:

a. Dynamic network configuration is not limited by the actuation of the agent terminal nor the operating system. So a user can actuate and finish network configuration for any linked agent terminal when the agent terminal is supported by standby electricity. Even the operating system can be installed on the agent terminal remotely through the managing server.

b. Artificial processes are reduced to avoid wrong network configuration and save time.

c. IP management through the managing server provides flexibility for the network configuration of the agent terminal to avoid complex configuration procedures caused by frequently IP changes or terminal replacement.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention.

FIG. 3 is a detailed flow chart for step 100 in FIG. 2.

FIG. 4 is a detailed flow chart for step 400 in FIG. 2.

DETAILED DESCRIPTION OF THE INVENTION

Figure 1:
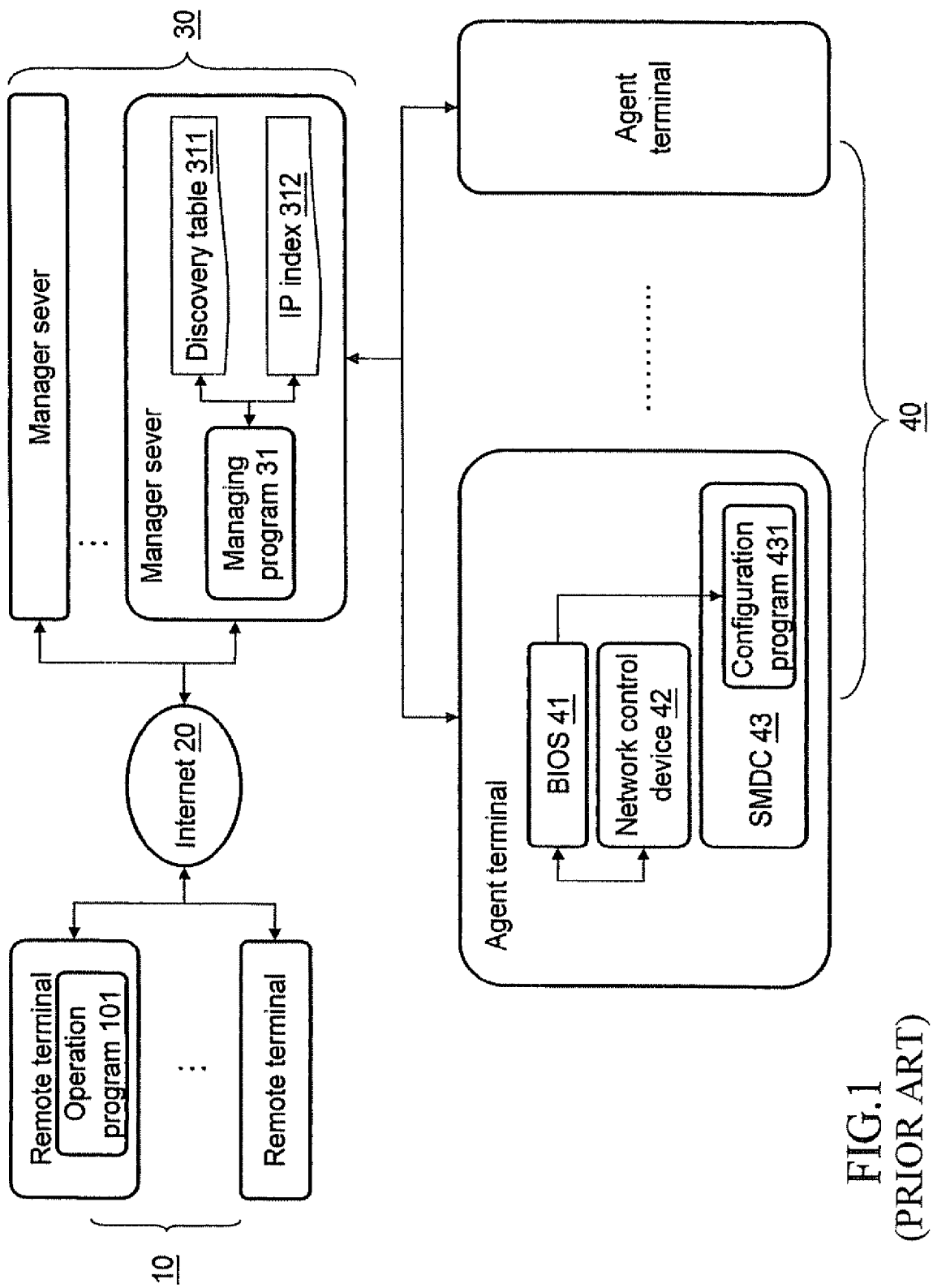
FIG. 1 FIG. 1 is a block diagram of an environment for remote network management.

The present invention discloses a computer-executable system and method for remotely dynamic network configuration, Which is applied to the remote network management environment as shown in FIG. 1. Generally, the managing servers 30 and the agent terminals 40 are linked by an intranet. The managing servers 30 are capable of controlling the linked agent terminal 40 remotely, while the managing servers 30 can follow the commands received from the remote terminals 10 that are linked via the internet 20 to remotely manage the agent terminal 40. FIG. 1 also shows that the remote network management environment has multiple remote terminals 10, multiple managing servers 30 and multiple agent terminals 40. As long as the remote terminals 10 have the IPs of the managing servers 30 and the agent terminals 10, each of the remote terminals 10 is capable of using the IPs by demand, linking to the corresponsive managing servers 30, and further remotely controlling the corresponsive agent terminals 40 linked to the corresponsive managing server 30, especially based on TCP/IP.

According to the present invention, the operation of the system for remote dynamic network configuration basically involves only the interactions between the managing servers 30 and the agent terminals 40 mentioned above. For clear description, only the remote dynamic network configuration between one of the managing server 30 and one of the agent terminal 40 are taken as explanatory subjects.

(1) The managing server 30 has a computer-executable managing program 31 and two data files for the managing program 31 to access/record: one is an agent terminal discovery table 311 for recording the first MAC addresses 501 of all the corresponsive, controllable agent terminal 40; the other is an IP index 312 to record all the first MAC addresses 501 and corresponsive first IPs 502.

The managing program 31 transmits detection packets 50 when the managing server 30 is actuated to detect if the newly-linked agent terminal 40 exists. In addition, the managing program 31 transmits identification packets 52 to the configuration program 431 of the SMDC 43 on the agent terminal 40 when the managing program 31 receives a first respond packet 51 from the agent terminal 40.

(2) The agent terminal 40 has substantially the first MAC address 501, which is generally recorded in a network control device 42 of the agent terminal 40, such as a network interface card or wireless network module. The agent terminal 40 further includes:

a. SMDC (Server Management Daughter Card) 43 has a baseboard management controller (BMC) for executing the configuration program 431 implemented in an EEPROM (Electrically Erasable Programmable Read-Only Memory). The configuration program 431 can be executed under standby electricity of the agent terminal 40. Thus, the agent terminal 40 needs not to be actuated to enable the SMDC 43 to operate. The configuration program 431 is capable of responding the first respond packet 51 to the managing program 31 when receiving the detection packet 50 from the managing program 31, and responding a second respond packet 53 when receiving the identification packet 52 from the managing program 31.

b. The BIOS (Basic Input/Output System) 41 is to execute initialization procedures of the agent terminal 40 when turned on. Moreover, the BIOS 41 can assign the first MAC address 501 of the network control device 42 on the agent terminal 40 to the configuration program 431.

Figure 2:
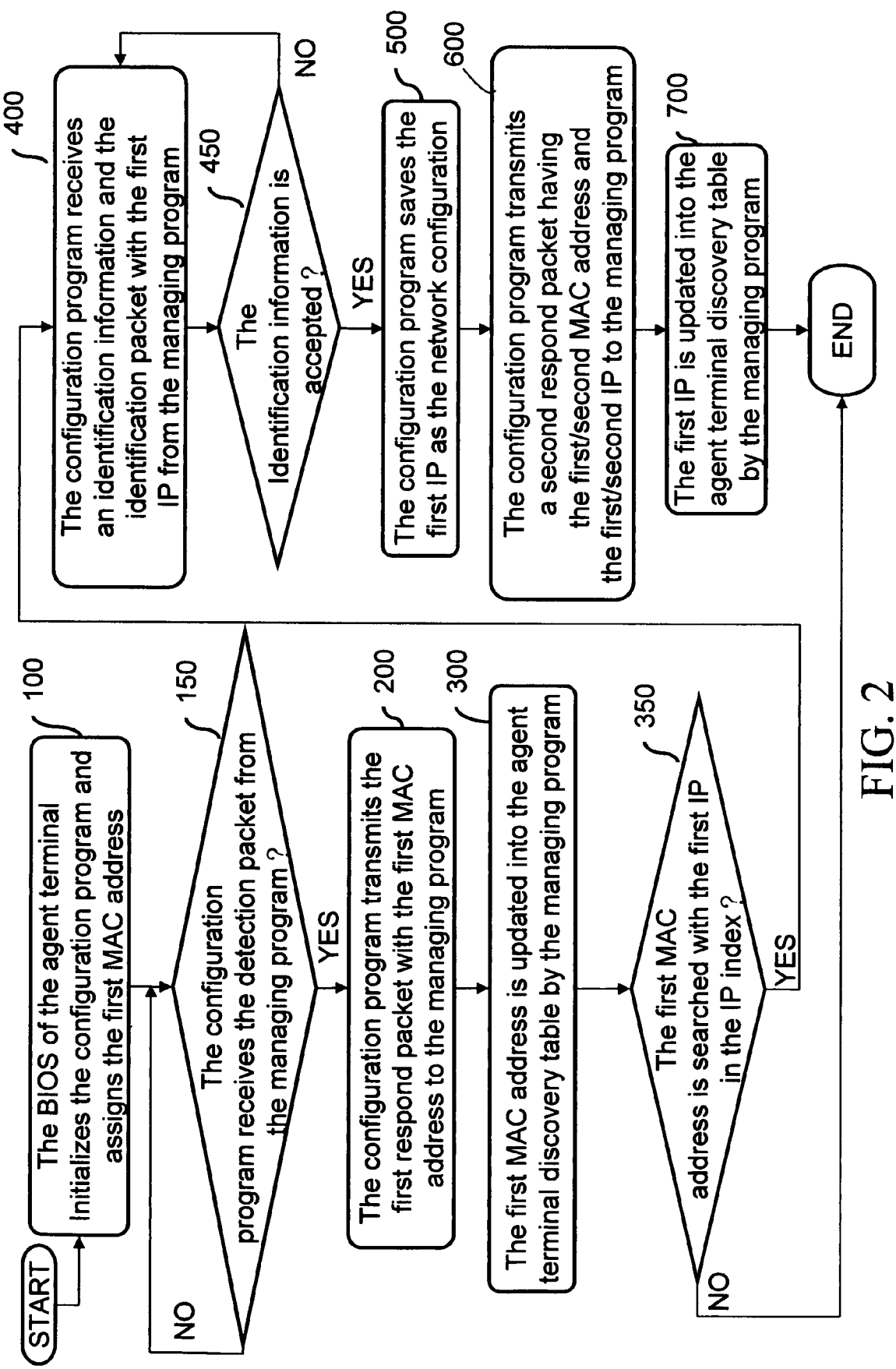
FIG. 2 is a flow chart of an embodiment of the method for remote dynamic network configuration according to the present invention.

FIG. 2 shows the method for remote dynamic network configuration according to the present invention.

First of all, actuate the managing server 30 in the remote network management environment. At this moment the managing program 31 of the managing server 30 is executed to constantly transmit the detection packets 50 to search newly-linked agent terminal 40 in the dedicated intranet.

When a new agent terminal 40 is about to be added to the dedicated intranet controlled under the managing server 30, the newly-linked agent terminal 40 needs to be turned on for the very first time. Afterwards, the BIOS 41 in the newly-linked agent terminal 40 starts the normal initialization procedures to actuate the SMDC 43 and the network control device 42 (such as a network interface card) with the first MAC address 501 recorded thereon. Meanwhile, initialize the configuration program 431 and assign the first MAC address 501 to the configuration program 431 (step 100). FIG. 3 shows the detailed procedures in step 100. The BIOS 41 first accesses the first MAC address 501 from the network control device 42 (step 110). And then the BIOS 41 transmits the first MAC address 501 to the configuration program 431 (step 120).

Figure 5A:
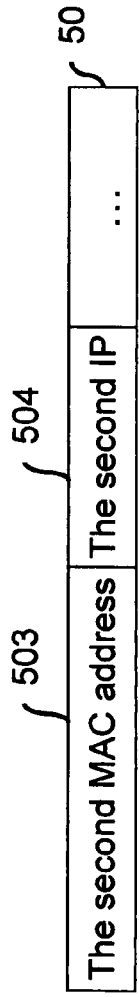
FIG. 5A is an explanatory diagram of the detection packet for step 150 in FIG. 2.

After the agent terminal 40 is booted up completely for the first time, the configuration program 431 will record the first MAC address 501 in SMDC 43. From now on the agent terminal 40 is capable of connecting to the dedicated intranet and the configuration program 431 starts to detect if the detection packet 50 is received from the managing program 31 of the corresponsive managing server 30 (step 150) In FIG. 5A, the detection packet 50 according to the present invention may follow Alert Standard Format (ASF). In the detection packet 50, the second MAC address 503 and the second IP 504 of the managing server 30 are combined to inform the agent terminal 40 about the basic information of the managing server 30. If the agent terminal 40 fails to receive the detection packet 50 after connects to the dedicated intranet, the managing server 30 may not be ready. Then the agent terminal 40 will remain waiting and receiving the detection packet 50. Oppositely, if the agent terminal receives the detection packet 50, the following network configuration procedures will be executed afterwards.

Figure 5B:
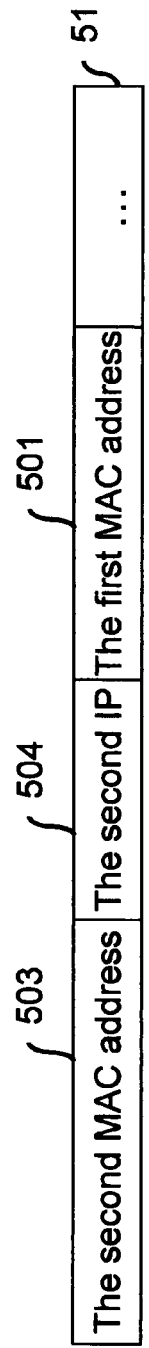
FIG. 5B is an explanatory diagram of the first respond packet for step 200 in FIG. 2.

When the configuration program 431 receives the detection packet 50, the configuration program 431 will transmit the first respond packet 51 to the managing program 31 (step 200). The first respond packet 51 can follows the specification of ASF. In FIG. 5B, the first respond packet 51 includes the second MAC address 503 and the second IP 504 received form the managing server 30, and the first MAC address 501 that represents the agent terminal 40. When the managing program 31 receives the first respond packet 51, the first MAC address 501 in the first respond packet 51 will be first updated into the agent terminal discovery table 311 (step 300); which means the managing server 30 have already known the existence of the newly-linked the agent terminal 40 in the dedicated intranet.

Next, the managing program 31 further confirms if the agent terminal 40 is a predetermined and controllable subject in the dedicated intranet. The confirmation is in accordance with the result whether the first MAC address 501 is pre-established in the IP index 312 and the first IP 502 is searched in the IP index 312. (step 350) If there does not exit the first MAC address 501 for the agent terminal 40 in the IP index 312, the agent terminal 40 is not the predetermined and controllable subject. Then no network configuration procedures will be proceeded with.

Figure 5C:
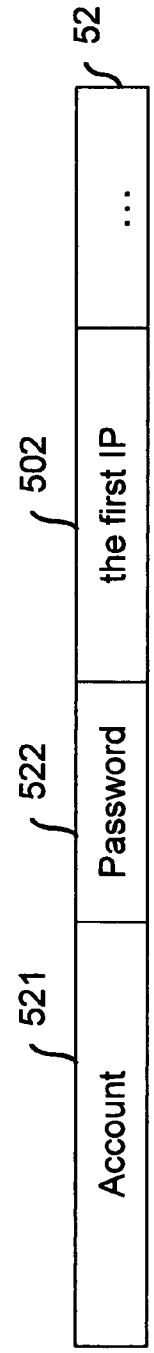
FIG. 5C is an explanatory diagram of the identification packet for step 400 in FIG. 2.

In the opposite, If in IP index 312 the first MAC address 501 is found, the managing program 31 will then generate the identification packet 52 and transmit to the configuration program 431 (step 400). As shown in FIG. 5C, the identification packet 52 includes the first IP 502 for assigning to the agent terminal 40, and an identification information that has an account 521 and a password 522. (For certain environments or situations that extra identification procedures are not necessary, the section of the identification information should be omitted.)

FIG. 4 shows the detailed procedures in the step 400. The identification information is inputted by a user managing server 30 (step 410), which is combined by the inputted account 521 and the inputted password 522, or by another set of account 521 and password 522 pre-established in the managing program 31. The managing program 31 will transmit the identification packet generated from the first IP 502 and the identification information to the configuration program 431 (step 420).

Figure 5D:
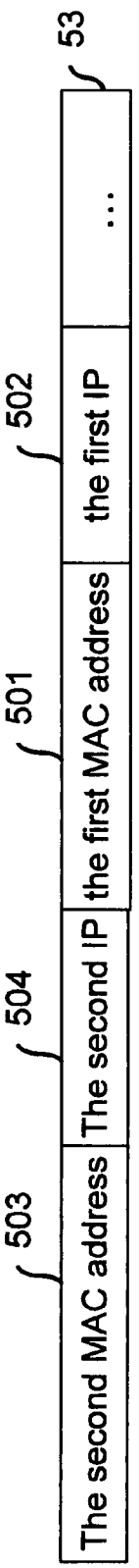
FIG. 5D is an explanatory diagram of the second respond packet for step 600 in FIG. 2.

When the configuration program 431 receives the identification packet 52, the identification information is accepted only its account 521 and password 522 match the ones pre-established in the configuration program 431. (step 450) If both match, the managing server 30 is accepted to remotely manage the agent terminal 40; otherwise, the configuration program 431 can request the managing server 30 to repeat the above identification procedures. When the identification information of the identification packet 52 is accepted, the configuration program 431 will save the first IP 502 in the identification packet 52 as the network configuration (step 500). Right now the agent terminal 40 has completed its network configuration but still need to inform the managing server 30 about its final network configuration. Therefore the second respond packet 53, as shown in FIG. 5D, is transmitted to the managing program 31. The second respond packet 53 includes the second MAC address 503 and the second IP 504 of the managing server 30, and the first MAC address 501 and the first IP 502 of the agent terminal 40 (step 600).

When the managing program 31 receives the second respond packet 53, what is sure is the agent terminal 40 has accepted the identification information and allowed to be controlled by the managing server 30. The managing program 31 will then update the confirmed first IP 502 into the agent terminal discovery table 311 for the operation of remote management (step 700). Right now all procedures of dynamic network configuration for the agent terminal 40 are finished.

When the network configuration of the agent terminal 40 is done, the managing server 30 may proceed TCP/IP based remote network management of the agent terminal 40 through IP. Please refer to FIG. 1 again. Now the remote terminals 10 connected through the internet 20 and the managing server 30 may use its the operation program 101 to execute TCP/IP based remote network management of the agent terminal 40 according to the agent terminal discovery table 311 of the managing server 30.

Figure 6:
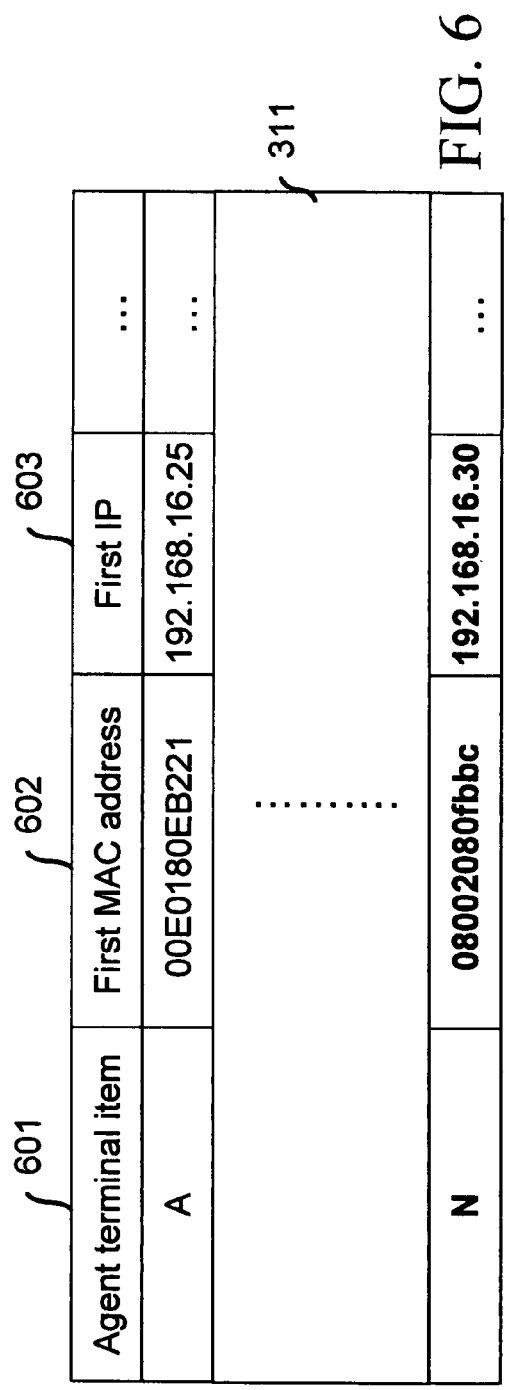
FIG. 6 is an explanatory diagram of the agent terminal discovery table in an embodiment according to the present invention.
Figure 7:
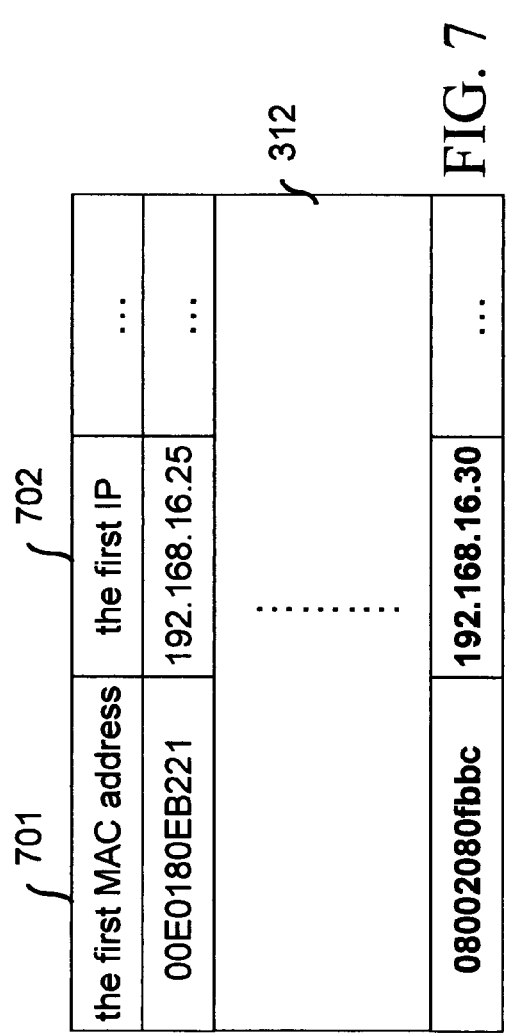
FIG. 7 is an explanatory diagram of the IP index in an embodiment according to the present invention.
Figure 8:
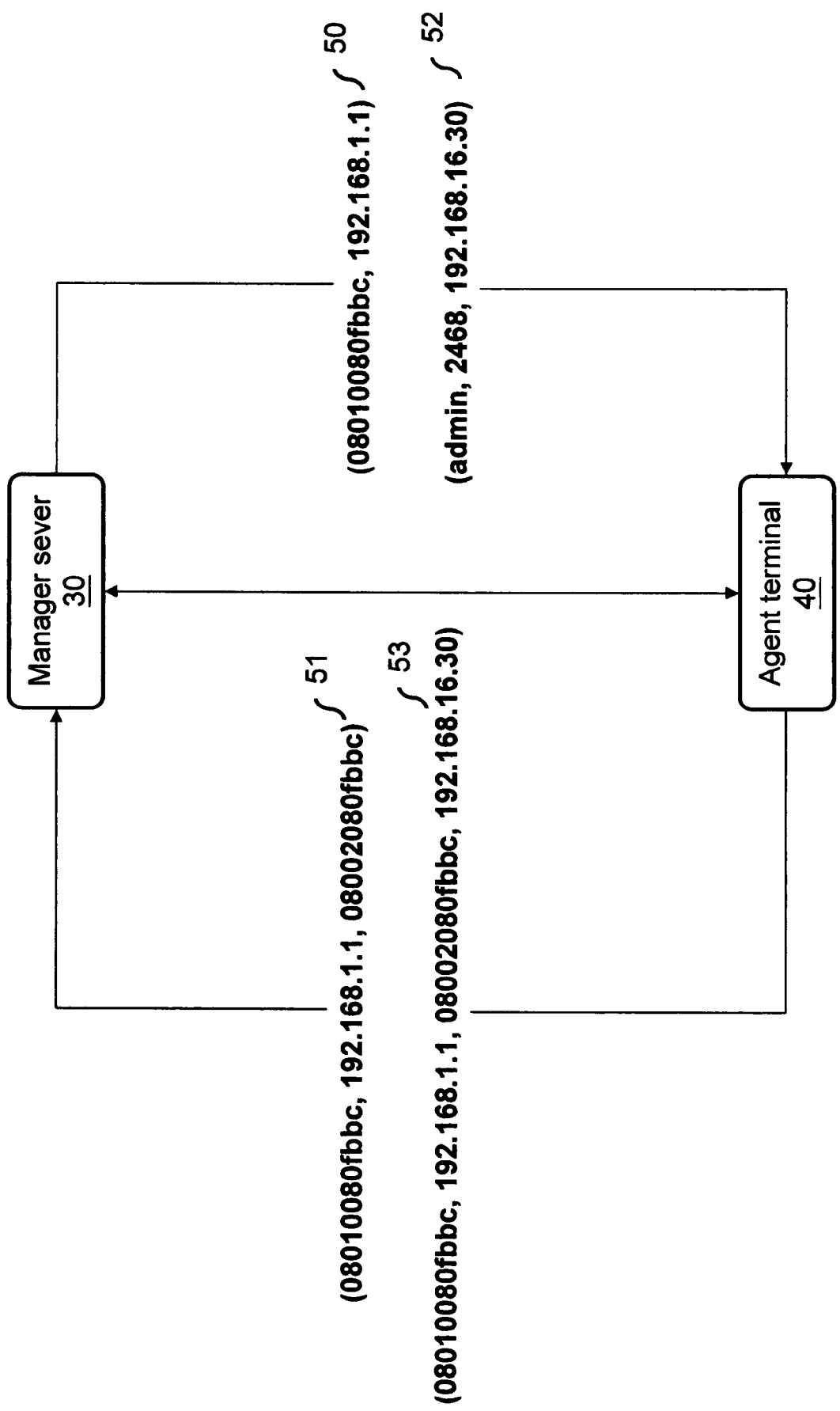
FIG. 8 is an explanatory diagram of an embodiment of the method for remote dynamic network configuration according to the present invention.

In the end, we use FIGS. 6, 7 and 8 to explain other embodiments according to the present invention. First of all, in FIG. 6 we can see that the agent terminal discovery table 311 includes at least fields of an agent terminal item 601, the first MAC address 602 and the first IP603. Each of the agent terminal item 601 (such as the agent terminal item A-601) is followed with various information of the agent terminal 40. The first MAC address 602 and the first IP 603 will become new parts of the agent terminal item 601 after the agent terminal 40 is confirmed to finish its network configuration.

In FIG. 7, the IP index 70 includes at least fields of the first MAC address 701 and the first IP 702. Every item represents the network configuration information of one agent terminal 40 that allows to be controlled by the managing server 30. The IP index 70 is established in advance in the managing server 30.

FIG. 8 shows a simplified explanatory chart for an embodiment that adds a newly-linked agent terminal item N-601. Assume that the managing server 30 includes N−1 controllable agent terminal item 601. All the processes during network configuration, and the practical contents and relations of transmitted/received packets between the managing server 30 and the agent terminal 40 may be fully understood herein.

When the agent terminal 40 is connected to the dedicated intranet, the detection packet 50 from the managing program 31 of the managing server 30 will be received first. The detection packet 50 includes the information of the second MAC address 503 and the second IP 504, such as "08010080fbbc 192,186.1.1". Then the configuration program 431 of the agent terminal 40 will respond the first respond packet 51 to the managing program 31. Except the second MAC address 503 and the second IP 504 in the detection packet 50, the first respond packet 51 further includes the information of the first MAC address 501 that represents the agent terminal 40, such as "08010080fbbc, 192.168.1.1, 08002080fbbc". When the managing program 31 receives the first respond packet 51, the first MAC address 501 is added into the agent terminal discovery table 311 and become a new agent terminal item N601; that is, to add the first MAC address 501 (08002080fbbc) of the agent terminal 40 into the field of the first MAC address 602 in the agent terminal item N-601. Afterwards, the managing program 31 transmits a identification packet 52, which includes instantly-input or pre-established identification information, such as account 521 ("admin") and password 522 ("2468"), and the first IP502 ("192.168.16.30") corresponsive to the first MAC address 501 ("08002080fbbc") recorded in the IP index 312. Consequently, the final identification packet 52 transmitted to the configuration program 431 will probably be "admin, 2468, 192.168.16.30".

When the configuration program 431 received the identification packet 52, the identification information needs to be examined if it matches. If so, the second respond packet 53 is transmitted to the managing program 31. Now the second respond packet will includes the complete information of the managing server 30 and the agent terminal 40, which is the second MAC address 503, the second IP 504, the first MAC address 501 and the first IP 502 ("08010080fbbc, 192.168.1.1, 08002080fbbc, 192.168.16.30"). The complete network configuration information of the agent terminal 40 received by the managing program 31 will be recorded in the agent terminal discovery table 311. Thus the new addition operation of the agent terminal item N-601 is accomplished and so as the remote dynamic network configuration for the agent terminal 40, thereby enables the remote terminals 10 or the managing server 30 to execute TCP/IP based remote network management of the agent terminal 40. More precisely, the operation program 101 (FIG. 1) of the remote terminal 10 will be provided with the agent terminal discovery table from the managing program 31 to be capable of controlling the agent terminal 40 through the first IP 502.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A computer-executable method for dynamically and remotely configuring a network of at least one agent terminal through a managing server, the agent terminal having a first medium access control (MAC) address and a server management daughter card (SMDC) for executing a configuration program, the managing server executing a managing program to communicate with the agent terminal through an intranet, the method comprising the steps of:
   assigning the first MAC address to the configuration program;
   receiving a detection packet from the managing program, and responding a first respond packet with the first MAC address by the configuration program;
   updating the first MAC address by the managing program into an agent terminal discovery table;
   responding an identification packet with a first internet protocol (IP) to the configuration program if the first IP corresponsive to the first MAC address is found in an IP index by the managing program;
   saving the first IP of the identification packet and responding a second respond packet with the first MAC address and the first IP to the managing program; and
   updating the first IP to the agent terminal discovery table corresponsive to the first MAC address.

2. The method of claim 1, wherein the step of assigning the first MAC address to the configuration program comprising the steps of:
   accessing the first MAC address of a network control device on the agent terminal through a basic input/output system (BIOS) of the agent terminal; and
   transmitting the first MAC address from the BIOS to the configuration program for saving therein.

3. The method of claim 1, wherein the step of transmitting the identification packet with the first IP to the configuration program comprising the steps of: inputting an identification information to the managing program; and generating the identification packet according to the first IP and the identification information, and transmitting to the configuration program.

4. The method of claim 3, wherein the identification packet is compatible with Alert Standard Format (ASF) and further comprises the identification information.

5. The method of claim 1, wherein the detection packet is compatible with ASF and comprises a second MAC address and a second IP of the managing server.

6. The method of claim 5, wherein the first respond packet is compatible with ASF and comprises the second MAC, the second IP and the first MAC address.

7. The method of claim 5, wherein the second respond packet is compatible with ASF and comprises the second MAC address, the second IP, the first MAC address and the first IP.

8. The method of claim 1 further comprising the step of providing the agent terminal discovery table from the managing program to an operation program of at least one remote terminal through internet.

9. The method of claim 8, wherein the operation program controls the agent terminal through the first IP.

10. A computer-executable system for dynamically and remotely configuring a network, comprising:
    at least one agent terminal having a first Medium Access Control (MAC) address, further comprising:
       a Server Management Daughter Card (SMDC) for executing a configuration program that responds a first respond packet and a second respond packet; and
       a Basic Input/Output System (BIOS) for assigning the first MAC address to the configuration program; and a managing server, communicating with the agent terminal through an intranet, executing a managing program that accesses/records an agent terminal discovery table and an internet protocol (IP) index for transmitting a detection packet and an identification packet, the agent terminal discovery table having the first MAC address corresponsive to the agent terminal, the IP index having a first IP corresponsive to the first MAC address;
    wherein the configuration program receives the detection packet from the managing program and responds the first respond packet with the first MAC address by the configuration program, the managing program updating the first MAC address into the agent terminal discovery table, the managing program responding the identification packet with the first IP to the configuration program if the first IP corresponsive to the first MAC address is found in the IP index, the configuration program saving the first IP of the identification packet and responding the second respond packet with the first MAC address and the first IP to the managing program, and the managing program updating the first IP to the agent terminal discovery table corresponsive to the first MAC address.

11. The system of claim 10, wherein the first MAC address is recorded in a network control device of the agent terminal.

12. The system of claim 11, wherein the configuration program is executed in an electrically erasable programmable read-only memory (EEPROM) of the network control device.

13. The system of claim 10, wherein the SMDC comprises a baseboard management controller (BMC) for providing remote control of the agent terminal through the first IP.

14. The system of claim 10, wherein the identification packet is generated by the first IP and an identification information inputted through the managing program.

15. The system of claim 14, wherein the identification packet is compatible with Alert Standard Format (ASF) and further comprises the identification information.

16. The system of claim 10, wherein the detection packet is compatible with ASF and comprises a second MAC address and a second IP of the managing server.

17. The system of claim 16, wherein the first respond packet is compatible with ASF and comprises the second MAC, the second IP and the first MAC address.

18. The system of claim 16, wherein the second respond packet is compatible with ASP and comprises the second MAC address, the second IP, the first MAC address and the first IP.

19. The system of claim 10 further comprising at least one remote terminal, the remote terminal executing a operation program to communicate with the managing server and access the agent terminal discovery table through internet.

20. The system of claim 19, wherein the operation program controls the agent terminal through the first IP.

* * * * *